United States Patent [19]
Ohmiya

[11] Patent Number: 6,010,396
[45] Date of Patent: Jan. 4, 2000

[54] BLADE COVER IN A CUTTING APPARATUS

[75] Inventor: Naoki Ohmiya, Tokyo, Japan

[73] Assignee: Disco Corporation, Tokyo, Japan

[21] Appl. No.: 09/118,061

[22] Filed: Jul. 17, 1998

[30] Foreign Application Priority Data

Jul. 22, 1997 [JP] Japan .................................. 9-195623

[51] Int. Cl.[7] .................................................. B24B 55/02
[52] U.S. Cl. ........................ 451/450; 451/451; 451/455; 451/446; 451/6
[58] Field of Search .................................. 451/451, 455, 451/446, 99, 21, 6

[56] References Cited

U.S. PATENT DOCUMENTS

| | | | |
|---|---|---|---|
| 3,543,451 | 12/1970 | Smith | 451/450 |
| 4,060,942 | 12/1977 | White et al. | 451/21 |
| 4,619,078 | 10/1986 | Uhlig | 451/5 |
| 5,111,625 | 5/1992 | Simpfendorfer et al. | 451/450 |
| 5,591,075 | 1/1997 | Chang | 451/451 |
| 5,718,615 | 2/1998 | Boucher et al. | 451/5 |

*Primary Examiner*—David A. Scherbel
*Assistant Examiner*—Shantese McDonald
*Attorney, Agent, or Firm*—Nikaido, Marmelstein, Murray & Oram LLP

[57] ABSTRACT

Disclosed is a blade cover in a cutting apparatus comprising a chuck table for holding a workpiece to be cut and cutting means for cutting the workpiece, which comprises a spindle having a rotary blade detachably attached thereto and a spindle housing for rotatably holding the spindle. The blade cover is fixed to the spindle housing on its front side, and it comprises: a rear nozzle assembly for flushing water to the rotary blade on its rear side; a front nozzle assembly for flushing water to the rotary blade on its front side; and blade detecting means for detecting the condition of the rotary blade. The front nozzle assembly is adapted to be put selectively in operative or inoperative position, and the blade detecting means is adapted to be put selectively in operative or inoperative position in unison with the front nozzle assembly. With this arrangement the rotary blade can be changed readily.

6 Claims, 6 Drawing Sheets

BLADE COVER IN A CUTTING APPARATUS

BACKGROUND OF THE INVENTION

1. Field of the Invention

The present invention relates to a cutting apparatus appropriate for use in dicing semiconductor wafers, and more particularly to a blade cover encircling and protecting the blade of such a cutting apparatus.

2. Description of Related Art

FIG. 10 shows the cutting means 50 of a conventional cutting apparatus for use in dicing semiconductor wafers. The cutting means 50 comprises a spindle 52 having a rotary blade 53 detachably attached thereto, a spindle housing 51 for rotatably holding the spindle 52, and a blade cover 54 fixed to the spindle housing 51 on its front side.

The blade cover 54 comprises a rear cover part 55 fixed to the spindle housing 51, a front cover part 57 fixed to the rear cover part 55 with a bolt 56 to sandwich a rotary blade 53 therebetween, and a blade detecting means 60 detachably fixed to the top of the rear cover part 55 with a bolt 58. The fine positional adjustment of the blade detecting means 60 can be made with the aid of a fine-adjustment screw 59.

The blade cover 54 has a rear nozzle assembly 55a for flushing water to the rear side of the rotary blade 53 provided on its rear cover part 55 and a front nozzle assembly 57a for flushing water to the front side of the rotary blade 53 provided on its front cover part 57. As seen from FIG. 11, the blade detecting means 60 has light-emitting and light-receiving elements 61 and 62 confronting each other across the rotary blade 53 for detecting breakage in the rotary blade 53 if any, in terms of the strength of light falling on the light receiving element 62.

Inconveniently the rotary blade 53 cannot be removed and changed without loosening the bolt 56 and removing the front nozzle assembly 57a because of its interference with the rotary blade 53 in the way. Also, there is a fear of breaking the rotary blade 53 by striking the rotary blade 53 against the front nozzle assembly 57a when attaching or removing the front cover part 57.

Still inconveniently, the fixing bolt 58 must be loosened to withdraw the blade detecting means 60 up above from the rotary blade 53 for removing the rotary blade 53. Also, in cleaning the blade detecting means 60 the fixing bolt 58 must be loosened and removed to remove the blade detecting means 60. In fixing the blade detecting means 60 to the spindle housing 51 the fixing bolt 58 is driven and tightened, and then, the blade detecting means 60 is subjected to fine positional adjustment by using the fine adjustment screw 59.

Thus, the conventional blade cover requires a tedious and time-consuming work in removing and attaching the rotary blade 53 and the blade detecting means 60 to the spindle housing 51.

SUMMARY OF THE INVENTION

One object of the present invention is to provide a blade cover structure which is so designed that the removing-and-attaching of the rotary blade and blade detecting means to the spindle housing is facilitated, thereby getting rid of such a tedious and time-consuming work as would be required in the conventional blade cover.

In a cutting apparatus comprising a chuck table for holding a workpiece to be cut and cutting means for cutting the workpiece held on the chuck table, the cutting means comprising a spindle having a rotary blade detachably attached thereto and a spindle housing for holding rotatably the spindle, a blade cover body, which is fixed to the spindle housing on its front side, is improved according to the present invention in that it comprises a rear nozzle assembly for flushing water to the rear side of the rotary blade on its rear side, a front nozzle assembly for flushing water to the front side of the rotary blade on its front side, and blade detecting means for detecting the condition of the rotary blade, the front nozzle assembly being adapted to be put selectively in operative or inoperative position, and the blade detecting means being adapted to be put selectively in operative or inoperative position in unison with the front nozzle assembly.

With this arrangement the front nozzle assembly and the blade detecting means can be put in operative or inoperative position in unison, thereby making it unnecessary to handle these parts separately. Accordingly the machining work can be effected at an increased efficiency.

The front nozzle assembly may comprise an arm unit rotatably connected to the blade cover and a front nozzle integrally connected to the arm unit to be put selectively in operative or inoperative position by rotating the arm unit; and the blade detecting means may be movably fixed to the blade cover body for rising toward inoperative position and lowering toward operative position in unison with the inclining of the front nozzle assembly by means of engagement of the arm unit with the blade detecting means.

With this arrangement the blade detecting means can be raised or lowered in unison with the rotation or angular inclination of the front nozzle assembly, thereby bringing the blade detecting means and the front nozzle assembly to the position in which these parts causes no hindrance to the changing of the rotary blade. This can be attained by a single finger-action by which the front nozzle assembly is rotated to be put aside.

The front nozzle body may have a catch-and-hold means responsive to arrival of the front nozzle assembly at the operative position for holding the front nozzle assembly there. The catch-and-hold means may comprise a plate spring having engagement means formed therein and catch means formed in the blade cover body for catching the engagement means of the plate spring.

Such a catch-and-hold means can be advantageously used in place of a fastening bolt, which requires a tedious work in removing and driving the same.

The blade detecting means may be adapted to be released from the engagement member of the arm unit in response to arrival of the front nozzle assembly at the inoperative position, thereby setting the blade detecting means free of the blade cover body. With this arrangement the removing and attaching of the blade detecting means is facilitated.

The front nozzle assembly may have grip or handle means provided therewith. Thus, putting the front nozzle assembly in an oblique position is facilitated.

Other objects and advantages of the present invention will be understood from the following description of a blade cover structure according to one preferred embodiment of the present invention, which is shown in accompanying drawings.

DESCRIPTION OF THE PREFERRED EMBODIMENTS

Figure 1:
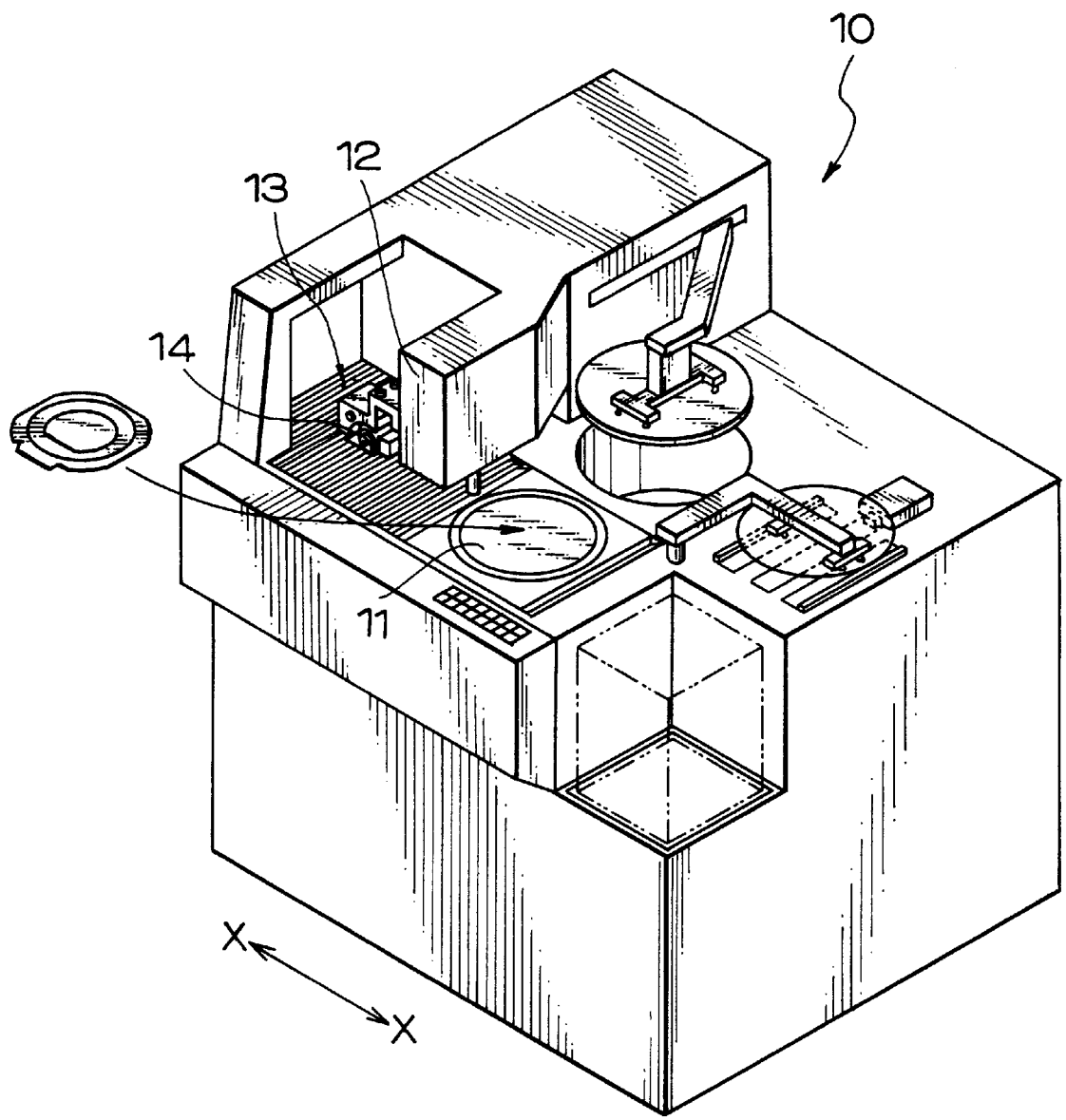
FIG. 1 is a perspective view of a cutting apparatus having a blade cover provided therewith according to the present invention.

Referring to FIG. 1, a cutting apparatus 10 comprises a chuck table 11 for holding a workpiece such as a semiconductor wafer to be diced, alignment means 12 and cutting means 13 for cutting the workpiece held on the chuck table 11. In operation the chucktable 11 is moved to the alignment means 12 in the X-axial direction to detect which area is to be cut or diced in the workpiece by subjecting it to pattern-matching process, and then, the chuck table 11 is moved further in the X-axial direction to the cutting station, in which the so detected area of workpiece is cut or diced.

Figure 2:
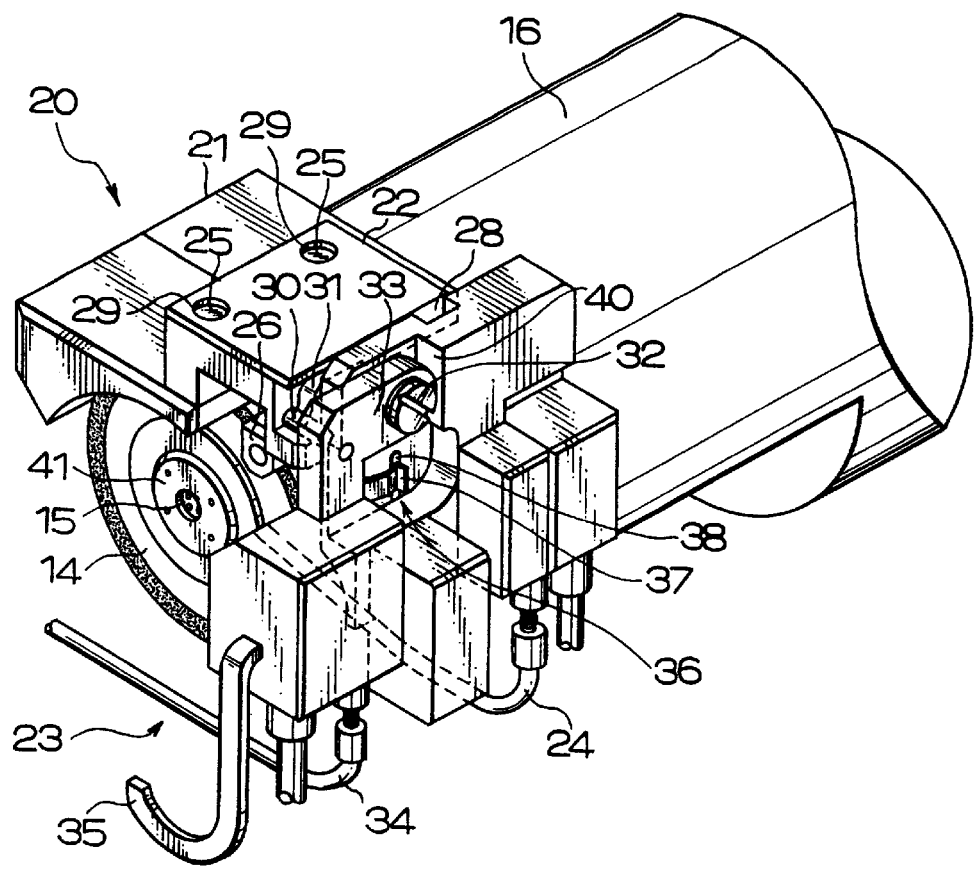
FIG. 2 is a perspective view of the blade cover structure of the cutting apparatus.

Referring to FIG. 2, the cutting means 13 comprises a spindle 15 having a rotary blade 14 detachably attached thereto and a spindle housing 16 for rotatably holding the spindle 15. A blade cover 20 is fixed to the spindle housing 16 on its front side. Specifically the blade cover 20 comprises a blade cover body 21 fixed to the top end of the spindle housing 16, a rear nozzle assembly 24 fixed to the bottom of the blade cover body 21 for flushing water to the rotary blade 14 on its rear side, a front nozzle assembly 23 fixed to the upper part of the blade cover body 21 via blade detecting means 22 (later described) for flushing water to the rotary blade 14 on its front side, and blade detecting means 22 movably fixed to the top of the blade cover body 21 for detecting the condition of the rotary blade 14.

Specifically the blade cover body 21 has two guide columns 25 standing upright on its top for guiding the rising and descending of the blade detecting means 22, and catch means 38 formed on its side for catching and holding the engagement portion 37 of the engagement means 36 of the front nozzle assembly 23. The front nozzle assembly 23 is adapted to be put selectively in operative or inoperative position, and the blade detecting means 22 is adapted to be put selectively in operative or inoperative position in unison with the front nozzle assembly 23, as later described in detail.

Figure 4:
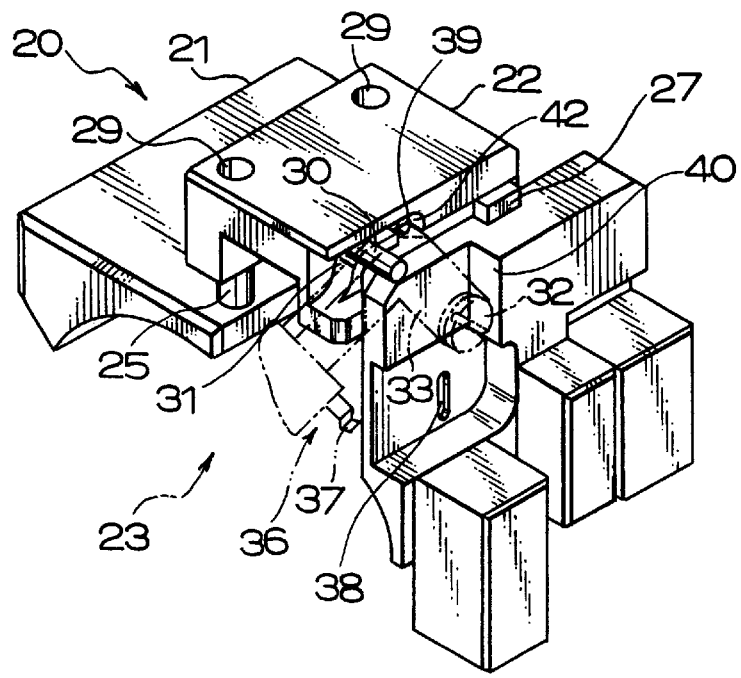
FIG. 4 is a perspective view of the blade cover structure, showing how the front nozzle assembly and the detecting means work in unison.
Figure 11:
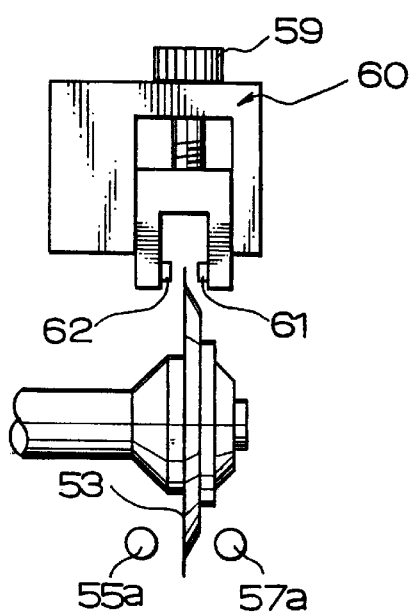
FIG. 11 shows the blade detecting means in the conventional cutting apparatus.

The blade detecting means 22 has a light-emitting element and a light-receiving element confronting with each other in its detecting section 26, as is the case with the blade detecting section in the conventional cutting apparatus as shown in FIG. 11. Referring to FIG. 4, the blade detecting means 22 has a guide piece 27 integrally connected thereto, and the guide piece 27 is slidably fitted in a guide slot 28, which is made in the blade cover body 21. The blade detecting means 22 can be guided by the guide piece 27 and the guide columns 25 in rising and descending. As seen from FIG. 4, the blade detecting means 22 has a guide slot 31 made on one side for guiding a round rod-like engagement projection 30 of the front nozzle assembly 23.

The front nozzle assembly 23 is so positioned relative to the blade cover body 21 to sandwich the rotary blade 14 between the front nozzle assembly 23 and the blade cover body 21 in operative position. The front nozzle assembly 23 comprises an L-shaped arm unit 33 rotatably connected to the blade cover body 21 for rotating about its pivot axle 32 and a front nozzle 34 integrally connected to the L-shaped arm unit 33 for flushing water to the rotary blade 14 and a handle 35 fixed to the L-shaped arm unit 33 for facilitating the rotation or inclination of the L-shaped arm unit 33 toward the inoperative position. The round rod-like engagement projection 30 is integrally connected to the L-shaped arm unit 33 to follow the guide slot 31 in the blade detecting means 22, and the engagement means 36 in the form of plate spring is integrally connected to the L-shaped arm unit 33 for holding the front nozzle assembly 23 in fixed position on the blade cover body 21.

Referring to FIGS. 2 and 3 again, in the operative position in which the rotary blade 14 is exposed on its opposite sides to the flushing of water from the front and rear nozzles 34 and 24, the front nozzle assembly 23 is put in fixed position on the blade cover body 21 with the resilient engagement portion 37 of the engagement means 36 of the front nozzle assembly 23 caught by the catch slot means 38 of the blade cover body 21.

When removing the rotary blade 14 from the spindle 15, the handle 35 is raised on the front side of the blade cover 20 toward inoperative position, disconnecting the resilient engagement means 36 of the front nozzle assembly 23 from the catch slot means 38 of the blade cover body 21 to rotate the L-shaped arm unit 33 about the pivot axle 32.

Figure 3:
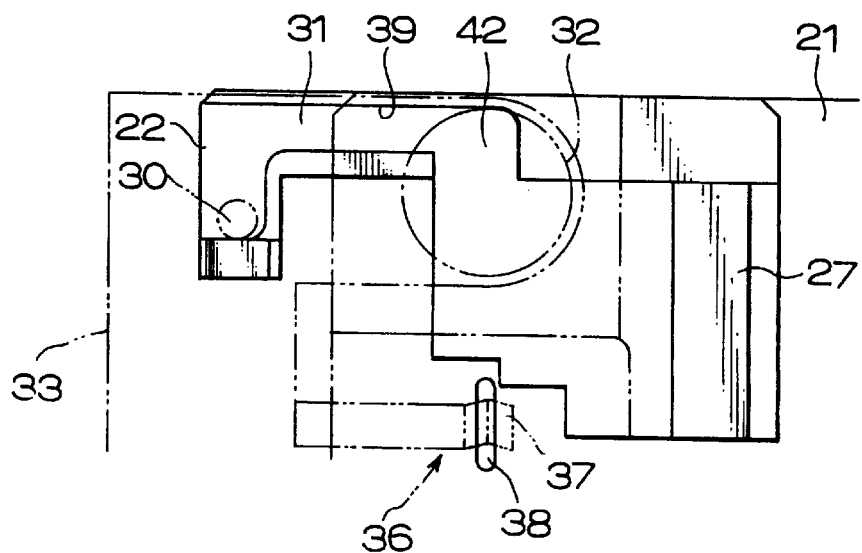
FIG. 3 shows how the front nozzle assembly is operatively engaged with the blade cover body and the blade detecting means.
Figure 5:
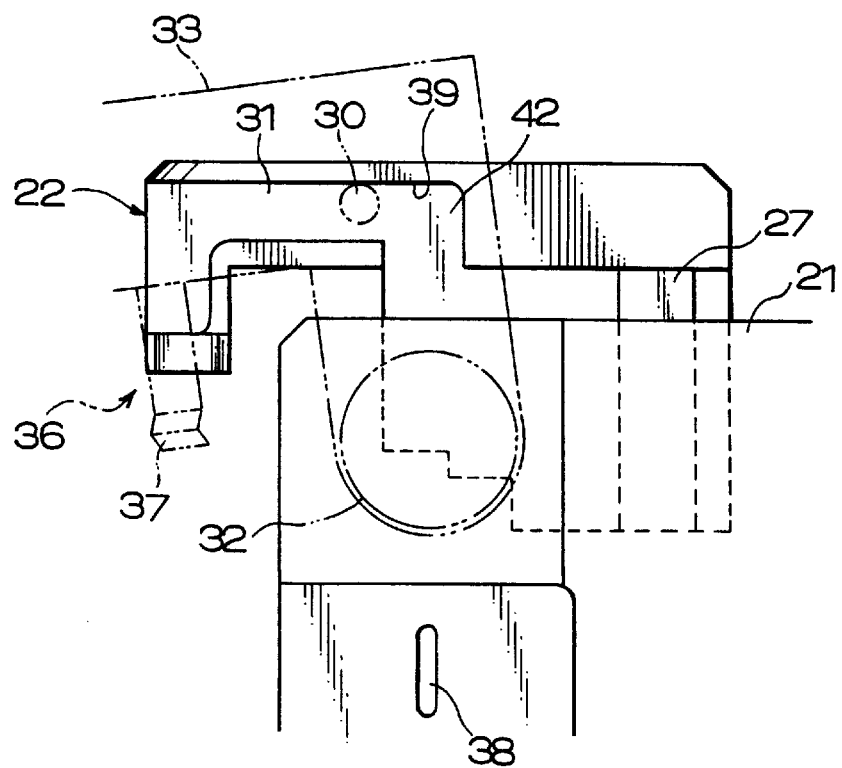
FIG. 5 shows how the front nozzle assembly is operatively engaged with the blade cover body and the blade detecting means.

As seen from FIGS. 2 and 3, the round rod-like engagement projection 30 of the L-shaped arm unit 33 remains in the lower end of the guide slot 31 prior to rotation of the L-shaped arm unit 33. As the L-shaped arm unit 33 is rotated, the round rod-like engagement projection 30 is made to follow the guide slot 31, thus rising upward until it has reached the ceiling level 39 of the guide slot 31. As the turning of the L-shaped arm unit 33 is continued by raising the handle 35 even higher, the round rod-like engagement projection 30 is made to advance backward in the guide slot 31, raising the ceiling 39 upward while the guide piece 27 of the blade detecting means 22 is allowed to rise in the guide slot 28 of the blade cover body 21. Thus, the blade detecting means 22 is raised while being guided by the guide columns 25 in the guide holes 29 of the blade detecting means 22, as seen from FIGS. 4 and 5. Although not shown in these drawings, the front nozzle 34 of the L-shaped arm unit 33 is inclined up as the L-shaped arm unit 33 is made to rotate.

Figure 6:
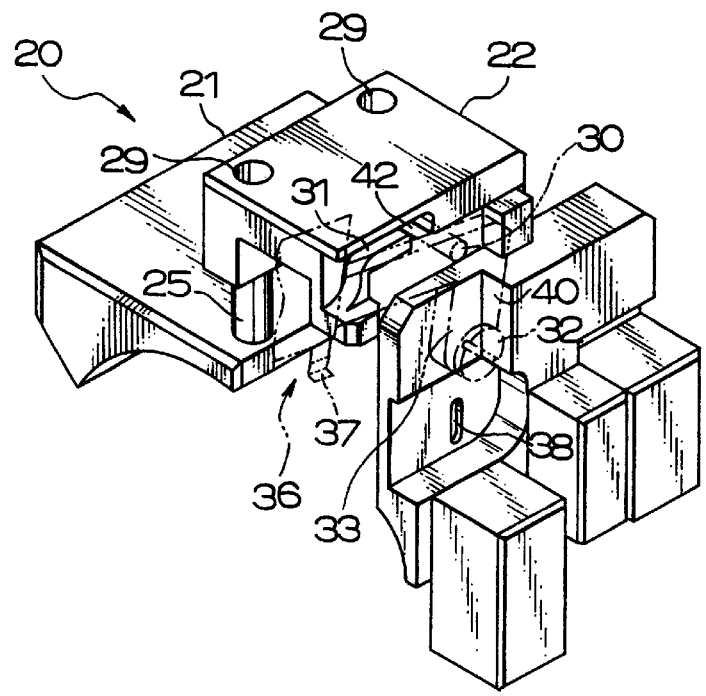
FIG. 6 shows how the front nozzle assembly is operatively engaged with the blade detecting means.
Figure 7:
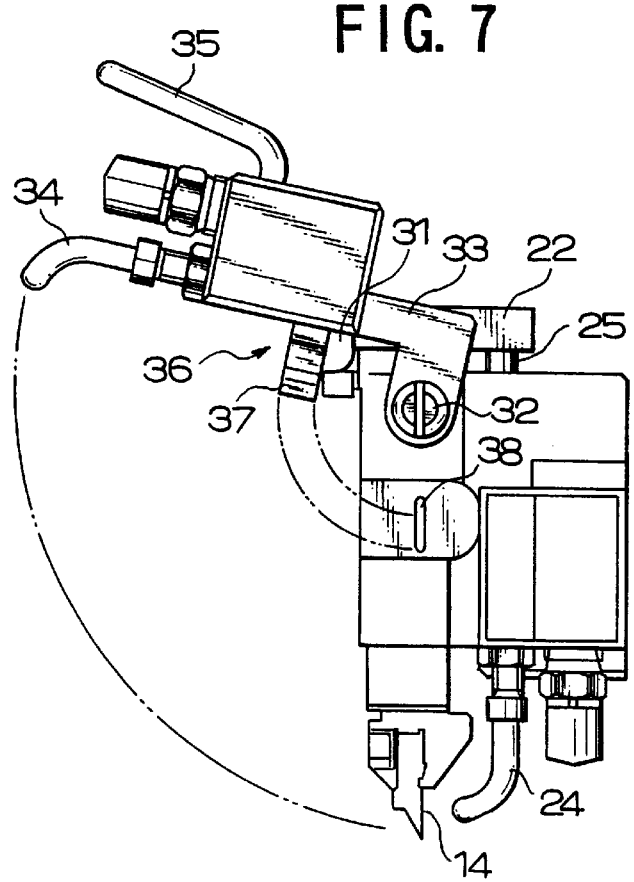
FIG. 7 illustrates how the blade cover is put in inoperative position.
Figure 8:
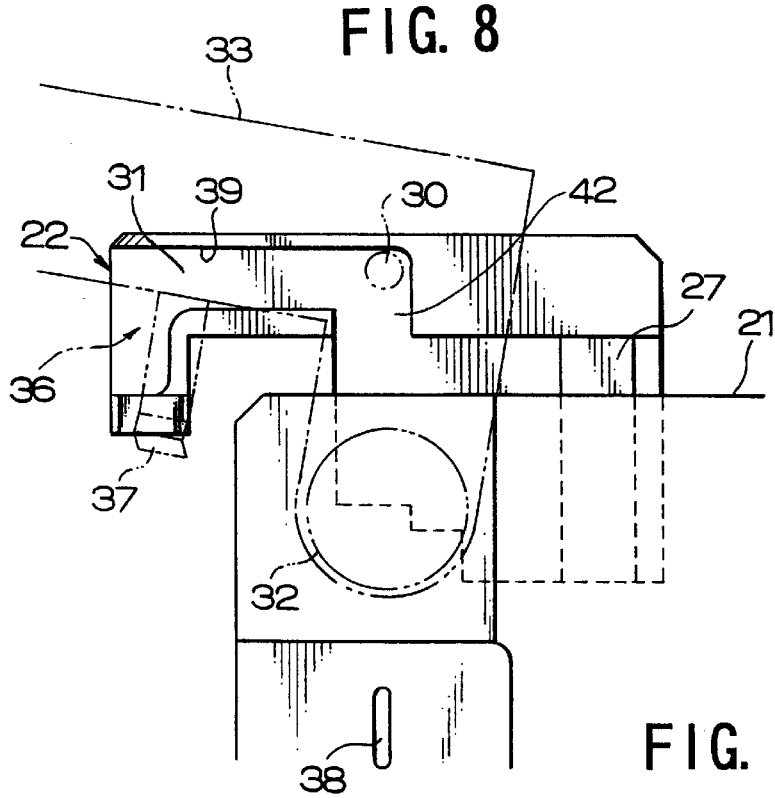
FIG. 8 shows how the front nozzle assembly is operatively engaged with the blade cover body and the blade detecting means.
Figure 9:
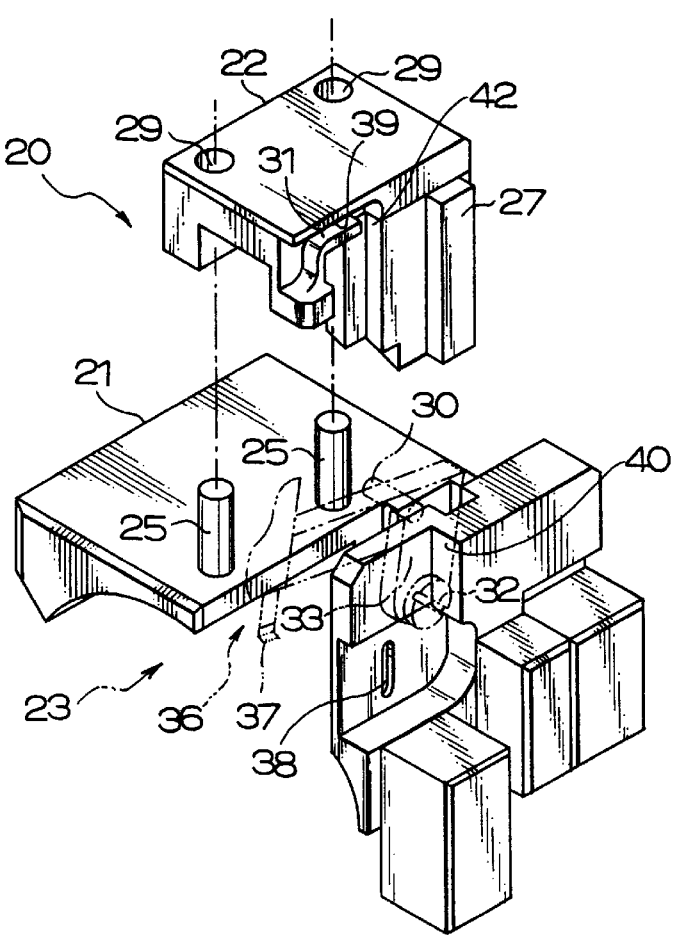
FIG. 9 illustrates how the blade detecting means is removed or attached to the blade cover body.
Figure 10:
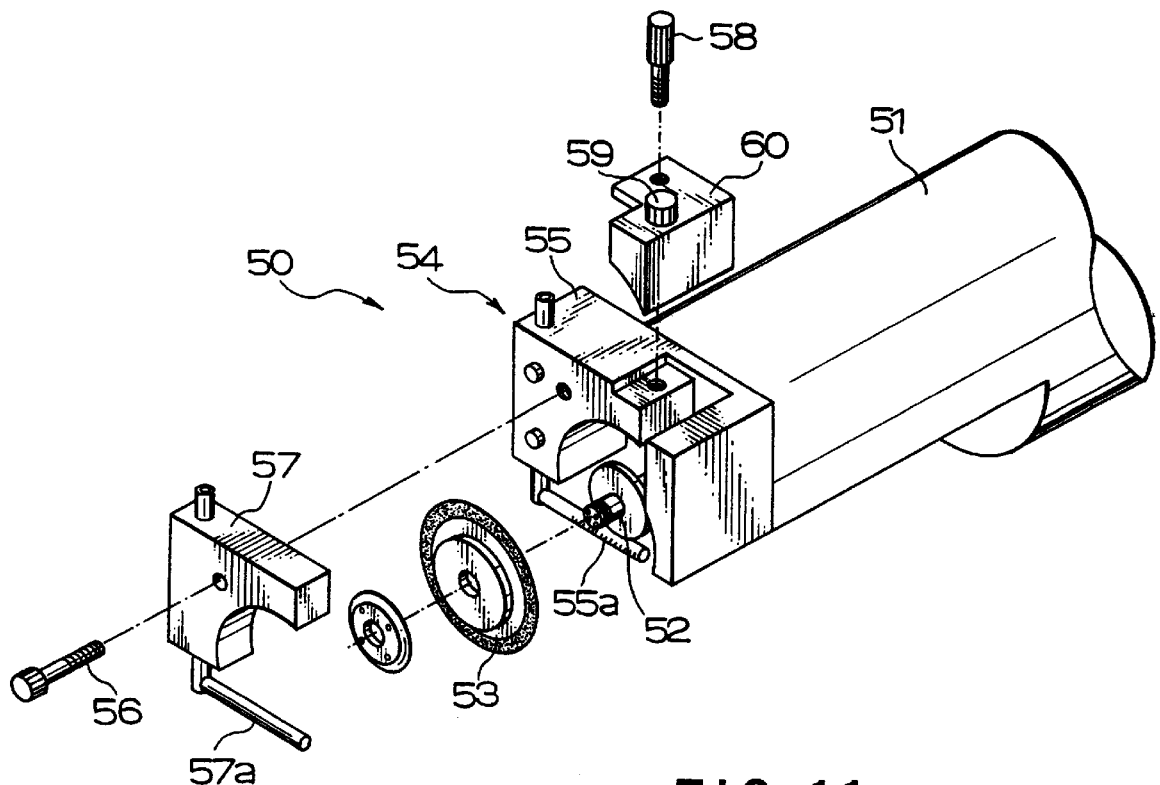
FIG. 10 is an exploded perspective view of a conventional blade cover structure.

When the turning of the L-shaped arm unit 33 is continued further to abut against the detent 40 of the blade cover body 21, the front nozzle assembly 23 is put in inoperative position, as shown in FIGS. 6, 7 and 8. In this position the front nozzle 34 and the blade detecting means 22 are raised up above the rotary blade 14, thereby making it impossible for the rotary blade 14 to be impeded by the front nozzle 34 and the blade detecting means 22 when the rotary blade 14 is removed and attached to the spindle 15. Thus, the changing of the rotary blade 14 is facilitated. As a matter of fact, the rotary blade 14 can be changed simply by loosening and removing the screw 41 from the spindle 15.

When the front nozzle assembly 23 is put in inoperative position, the round rod-like engagement projection 30 leaves the guide slot 31, staying above the unclosed end 42 of the guide slot 31, as seen from FIG. 8. Then, the guide piece 27 and the guide holes 29 can be separated from the guide slot 28 and the columns 25 respectively, thereby permitting the blade detecting means 22 to be removed from the blade cover body 21.

The blade detecting means 22 can be mounted to the blade cover body 21 as follows: First, the round rod-like engagement projection 30 is pushed in the guide slot 31 via the unclosed end 42 of the guide slot 31, and then, the L-shaped arm unit 33 is rotated downward, allowing the round rod-like engagement projection 30 to advance forward in the guide slot 31. At the same time, the blade detecting means 22 is made to descend while allowing the guide piece 27 to move in the guide slot 28 of the blade cover body 21, and at the same time, allowing the guide columns 25 to move in the guide holes 29. When the front nozzle assembly 23 is put in operative position, the blade detecting means 22 is put in operative position, as seen from FIGS. 2 and 3. The front nozzle assembly 23 is retained positively in operative position with the resilient engagement means 36 of the front nozzle assembly 23 is caught by the catch means 38 of the blade cover body 21.

As may be understood from the above, the front nozzle assembly 23 and the blade detecting means 22 are so ganged with each other through the agency of the engagement projection 30 that the front nozzle assembly 23 and the blade detecting means 22 may be put in operative or inoperative position simultaneously.

What is claimed is:

1. In a cutting apparatus comprising a chuck table for holding a workpiece to be cut and cutting means for cutting the workpiece held on the chuck table, the cutting means comprising a spindle having a rotary blade detachably attached thereto and a spindle housing for rotatably holding the spindle, a blade cover fixed to the spindle housing on its front side, the blade cover comprising: a rear nozzle assembly for flushing water to the rotary blade on its rear side; a front nozzle assembly for flushing water to the rotary blade on its front side; and blade detecting means for detecting the condition of the rotary blade, the front nozzle assembly being adapted to be put selectively in operative or inoperative position, and the blade detecting means being adapted to be put selectively in operative or inoperative position in unison with the front nozzle assembly.

2. A blade cover according to claim 1 wherein the front nozzle assembly comprises an arm unit rotatably connected to the blade cover body and a front nozzle integrally connected to the arm unit to be put selectively in operative or inoperative position by rotating the arm unit; and the blade detecting means is movably fixed to the blade cover body for rising toward inoperative position and lowering toward operative position in unison with the inclining of the front nozzle assembly by means of engagement of the arm unit with the blade detecting means.

3. A blade cover according to claim 2 wherein the front nozzle body has a catch-and-hold means responsive to arrival of the front nozzle assembly at the operative position for holding the front nozzle assembly there.

4. A blade cover according to claim 3 wherein the catch-and-hold means comprises a plate spring having engagement means formed therein and catch means formed in the blade cover for catching the engagement means of the plate spring.

5. A blade cover according to claim 4 wherein the blade detecting means is adapted to be released from the engagement member of the arm unit in response to arrival of the front nozzle assembly at the inoperative position, thereby setting the blade detecting means free of the blade cover body.

6. A blade cover according to claim 1, 2, 3, 4 or 5 wherein the front nozzle assembly has grip or handle means provided therewith.

* * * * *